2,975,185
PIPERIDINOL COMPOUNDS

Floyd E. Anderson, Morris Plains, and Jack Bobinski, Dover, N.J., assignors to Warner-Lambert Pharmaceutical Company, Morris Plains, N.J., a corporation of Delaware No Drawing. Filed May 2, 1958, Ser. No. 732,418

8 Claims. (Cl. 260—294.7)

This invention relates to certain piperidinol compounds and relates more particularly to certain novel substituted piperidinol compounds which are useful as central nervous system simulants on oral administration. This application is a continuation-in-part of application S. No. 543,259, filed October 27, 1955, now abandoned.

An object of this invention is the provision of novel chemical compounds which produce central nervous system stimulation on oral administration.

Other objects of this invention will appear from the following detailed description.

We have now found that the substituted piperidinols of the following general formula:

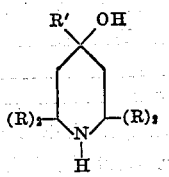

wherein R is an alkyl group containing one to three carbon atoms, and R' is an o-benzylphenyl or a bicyclohexylyl group exhibit pronounced central nervous system stimulation activity when orally administered. Esters of these hydroxy compounds such as the acetate and propionate may also be employed.

In the novel compounds of our invention R may be a methyl, ethyl or propyl group.

The above compounds may be obtained by reacting triacetoneamine, for example

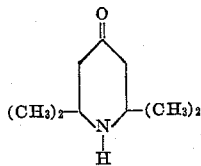

or the ethyl or propyl substituted homologue, with a Grignard reagent R'—MgX wherein R' has the meaning defining above and X is a halogen of the group consisting of bromine and iodine. In carrying out the condensation reaction, the usual precautions employed during a Grignard condensation are followed, including the use of an anhydrous reaction medium.

The compounds disclosed and claimed herein are unique in the series of related piperidinols in that closely related homologues varying only in the substituent R' do not exhibit central nervous system stimulation in equivalent dosages.

While the Grignard complex or addition product which is obtained as the product of the above reaction may be decomposed and the desired product isolated in the usual manner, a higher yield of the desired product is obtained and of an increased degree of purity if the Grignard complex is treated with aqueous ammonium chloride to form a solid precipitate, the precipitate separated and then suspended in aqueous sodium hydroxide, the suspension filtered and, after drying the solid remaining, extracting the latter with ether and, finally, removing the ether by evaporation. The crystalline product, thus separated, is obtained in a high degree of purity. The aqueous ammonium chloride solution employed in separating the Grignard complex in accordance with our improved process should be saturated with respect to ammonium chloride, while the aqueous sodium hydroxide solution may contain from 12 to 40% by weight of sodium hydroxide.

The mild conditions imposed by this novel procedure for decomposing the Grignard complex have certain distinct advantages in that they act to prevent the loss of the labile tertiary alcohol group.

The subsequent treatment of the Grignard complex precipitate with strong alkali and careful drying comprises an improved method which avoids the burdensome solvent extractions of the readily emulsifiable aqueous system which is normally encountered when these compounds are isolated by customary procedures. Further, the Grignard by-products as well as any unreacted triacetoneamine are completely eliminated from the product by our novel process and not only is a purer product obtained but the elimination of emulsification losses results in a higher yield.

In order further to illustrate our invention but without being limited thereto, the following examples are given:

Example I 71.4 parts by weight of o-benzyl-bromo-benzene in about 200 parts by weight of anhydrous ethyl ether are added slowly to 7 parts by weight of finely-divided magnesium metal over 2½ hours. The mixture is heated to reflux, then stirred for 6½ hours and then allowed to stand without further heating for about 12 hours. A solution of 30 parts by weight of triacetoneamine in about 80 parts by weight of anhydrous ether is added to the Grignard reagent at a rate sufficient to maintain reflux and, when the addition is complete, the reaction mixture is refluxed for 4½ hours.

To the Grignard complex, thus obtained, are slowly added about 50 parts by eight of a saturated aqueous solution of ammonium chloride and the solid precipitate is separated and washed with ether. After air drying, the solid is added to about 150 parts by weight of a 12% by weight aqueous solution of sodium hydroxide. The suspended particles are filtered to remove as much of the aqueous alkaline solution as possible and the solid dried at 40° C., pulverized, and extracted several times with ether. The combined ether extracts are evaporated and a precipitate of 4-(o-benzyl-phenyl)-2,2,6,6-tetramethyl-4-piperidinol obtained. After recrystallization from diisopropyl ether, 38 parts by weight of the product are obtained melting at 128° C. Analysis for $C_{22}H_{29}NO$ is, percent N: Calculated 4.33%, found 4.56%. The hydrochloride of 4-(o-benzyl-phenyl)-2,2,6,6-tetramethyl-4-piperidinol melts at 239° C.

Example II 47.5 parts by weight of 4-bicyclohexyl bromide are converted to the Grignard reagent as described in Example I, then reacted with triacetoneamine and the 4-(bicyclohexyl)-2,2,6,6-tetramethyl-4-piperidinol separated as the hydrochloride. A yield of 5.5 parts by weight of 4-(bicyclohexyl)-2,2,6,6-tetramethyl-4-piperidinol hydrochloride are obtained, the compound melting at 183–184° C. The free amine, however, is a liquid at room temperature.

Analysis for $C_{21}H_{39}NO \cdot HCl$ is:

|  | Percent N | Percent Cl |
|---|---|---|
| Calculated | 3.91 | 9.90 |
| Found | 4.02 | 9.94 |

It is understood that the foregoing detailed description is given merely by way of illustration and that many variations may be made therein without departing from the spirit of our invention.

Having described our invention, what we desire to secure by Letters Patent is:

1. Compounds of the formula:

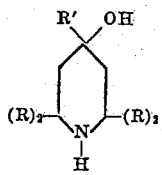

wherein R is an alkyl group containing one to three carbon atoms and R' is a member of the group consisting of bicyclohexylyl and benzylphenyl.

2. The compound 4-(o-benzyl-phenyl)-2,2,6,6-tetramethyl-4-piperidinol.

3. The acetate of 4-(o-benzyl-phenyl)-2,2,6,6-tetramethyl-4-piperidinol.

4. The compound 4-bicyclohexylyl-2,2,6,6-tetramethyl-4-piperidinol.

5. A process for the production of 4-R'-2,2,6,6-tetraalkyl-4-piperidinols of the formula:

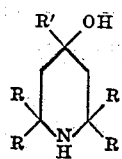

wherein R is an alkyl group containing one to three carbon atoms and R' is a member selected from the group consisting of bicyclohexylyl and benzylphenyl which comprises refluxing in the presence of anhydrous ether a compound of the formula:

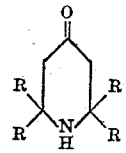

with a Grignard reagent R'—MgX wherein X is a member selected from the group consisting of bromine and iodine, treating the resulting Grignard complex with an aqueous ammonium chloride solution to form a precipitate, separating said precipitate, suspending the separated precipitate in an aqueous sodium hydroxide solution, filtering said suspension, extracting the recovered solids with an extracting solvent and recovering said 4-R'-2,2,6,6-tetraalkyl-4-piperidinol from the extract.

6. A process according to claim 5 wherein said aqueous ammonium chloride solution is saturated with respect to ammonium chloride and said aqueous sodium hydroxide solution comprises about 12 to about 40 percent by weight of sodium hydroxide.

7. A process according to claim 6 for the production of 4-(o-benzyl-phenyl)-2,2,6,6-tetramethyl-4-piperidinol wherein R is methyl and R' is o-benzylphenyl.

8. A process according to claim 6 for the production of 4-bicyclohexylyl-2,2,6,6-tetramethyl-4-piperidinol wherein R is methyl and R' is bicyclohexylyl.

References Cited in the file of this patent

UNITED STATES PATENTS

| 2,498,430 | Lee | Feb. 21, 1950 |
| 2,589,943 | Jensen | Mar. 18, 1952 |

OTHER REFERENCES

Clarke et al.: Ber. Deutsche Chemische Gesellschaft, vol. 45, pp. 2060-5 (1912).